April 12, 1938.        G. E. NEUBERTH        2,114,127
ROD COUPLING
Filed June 12, 1935
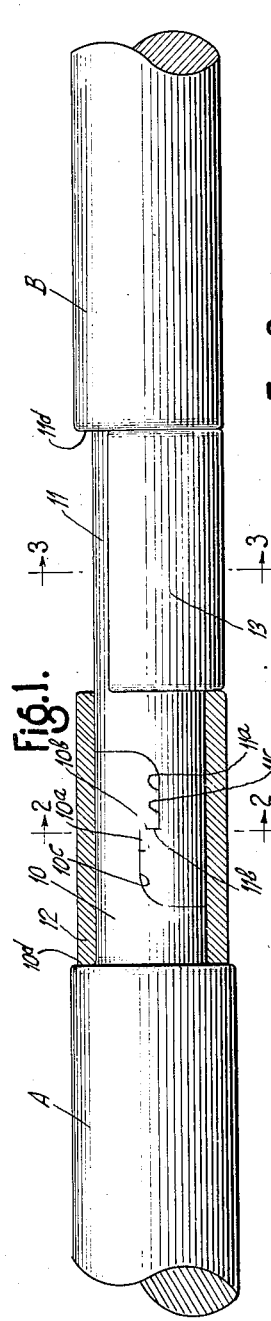
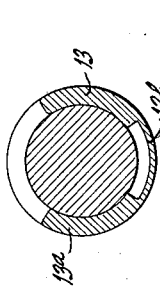
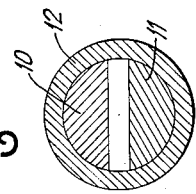
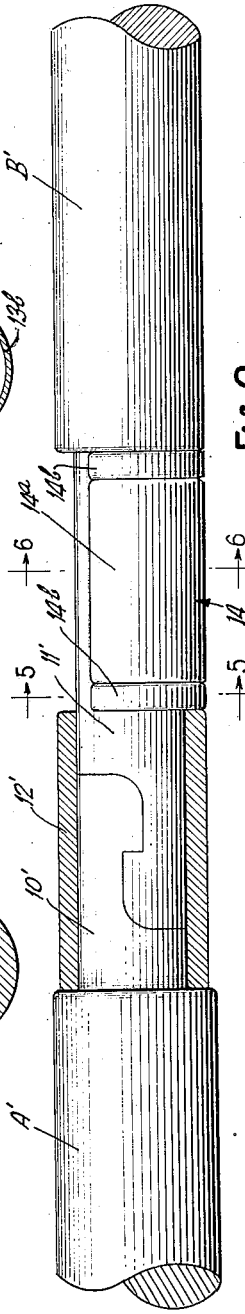
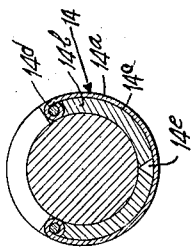
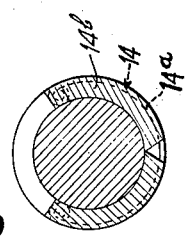
INVENTOR
George E. Neuberth
BY
Emery, Booth, Varney & Whittemore
ATTORNEYS Patented Apr. 12, 1938

2,114,127

UNITED STATES PATENT OFFICE 2,114,127

ROD COUPLING

George E. Neuberth, Newark, N. J., assignor to Tube Reducing Corporation, Wilmington, Del., a corporation of Delaware Application June 12, 1935, Serial No. 26,108

3 Claims. (Cl. 287—104)

This invention relates to a coupling for rods and is particularly adapted and intended to be used in connection with mandrels upon which tubular stock is reduced by devices which move to and fro and act successively upon short increments of length of the stock. For example, the mandrel may be used in a machine like that disclosed in my reissue Patent No. 18,329. In such machines the mandrel receives sudden end thrusts and rotative impulses of considerable magnitude and the coupling must prevent any relative movement between the connected parts and not come uncoupled or loose in use.

The object of the invention is to provide such a coupling which will hold the parts securely together but which may be quickly connected and disconnected. Further objects and novel features of the invention will be apparent from the following description of an exemplary embodiment thereof, reference being made throughout the description to the accompanying drawing, wherein:

Fig. 1 is a longitudinal section showing the parts assembled;

Fig. 2 is a cross section taken on the line 2—2 of Fig. 1;

Fig. 3 is a cross section taken on the line 3—3 of Fig. 1;

Fig. 4 is a longitudinal section showing a modified locking device;

Fig. 5 is a cross section taken on the line 5—5 of Fig. 4; and

Fig. 6 is a cross section taken on the line 6—6 of Fig. 4.

Referring to the drawing of the first modification, Figs. 1 to 3, the coupling comprises the adjoining reduced ends 10 and 11 of the parts to be coupled, for example a mandrel A and its tail piece B. The parts 10 and 11 are spliced together as by being flattened on their mating surfaces 10a, 11a respectively. They are formed with mating retaining elements, such for example as the shoulders 10b, 11b respectively which fit within corresponding notches 10c, 11c.

When the parts 10 and 11 have been placed together as shown in Fig. 1 a sleeve 12 is slid endwise over them to retain them in this position. The sleeve is bevelled interiorly at one end to tighten upon a corresponding bevelled portion on the mandrel. The external dimensions of the sleeve are approximately the same as those of the mandrel. When the sleeve is moved into assembled position its end abuts a shoulder 10d of the part 10 and an annular recess is left between its end and a shoulder 11d formed on the part 11.

To secure the sleeve in position a locking device such as the spring clip 13 is forced over the part 11 within the annular recess. The clip is preferably formed with thickened ends 13a and a flexible central portion 13b and is of sufficient length to completely fill the space between the end of the sleeve 12 and the shoulder 11d. The thick ends 13a thus have sufficient strength to take their portion of the end thrust to which the mandrel is subjected.

In Figs. 4-6 there is shown a modification of the locking device, generally designated by the numeral 14, in which the spring element 14a is made separately from the body portions 14b. A leaf spring which is disposed within a recess 14c and secured to the body portions by pins 14d is illustrated but obviously other types of springs might be employed. A gap 14e may be provided by bevelling the adjacent ends of the body members to permit spreading when the locking member is forced upon the mandrel.

In assembling the coupling the mandrel parts 10 and 11 are placed together in mating relationship, as shown in Fig. 1, and the sleeve 12 is pushed endwise over the joint. Then the locking device 13 or 14 is forced over the recessed portion until it fits properly. Preferably a clamp in which pressure can be gradually exerted until the locking device is fully seated is used. A similar device may be used for pulling the locking device off.

It will thus be seen that I have provided a simple, convenient and dependable coupling which may be easily connected and disconnected and which will hold the parts securely together until they are intentionally disconnected. While the coupling is described for use on a mandrel it will be obvious that it may have various other uses. Also while certain embodiments are illustrated the invention may have other embodiments within the scope of the subjoined claims.

I claim:

1. In a coupling for rod parts having reduced shouldered ends on said parts and interfitting retaining elements adapted to be engaged by lateral movement including shoulders and grooves on said ends, a sleeve slidable on said reduced ends and engaging one of the first mentioned shoulders when embracing said interfitting retaining elements in interlocked relation, and rigid locking means interposed between the end of the sleeve and the other one of said first mentioned shoulders with sufficient tightness to retain said second mentioned shoulders in constant close engagement and to take at least part of the end thrust on said rod parts, said locking means extending over more than half of the circumference and being adapted to take longitudinal thrust over its entire end surfaces.

2. A rod coupling as set forth in claim 1 in which said locking means is formed as a spring clip with the thick rigid portions connected by a thin resilient intermediate portion.

3. A rod coupling as set forth in claim 1 in which said locking means comprises separate thick rigid members connected by an embracing spring recessed into the intermediate portions thereof.

GEORGE E. NEUBERTH.